US009481310B2

(12) United States Patent
Chawlk et al.

(10) Patent No.: US 9,481,310 B2
(45) Date of Patent: Nov. 1, 2016

(54) VEHICLE STORAGE STRUCTURE

(71) Applicant: Nissan North America, Inc., Franklin, TN (US)

(72) Inventors: Michael Chawlk, Ypsilanti, MI (US); Brian Shepard, Ypsilanti, MI (US); Kelly Schlotterer, Commerce Township, MI (US)

(73) Assignee: Nissan North America, Inc., Franklin, TN (US)

( * ) Notice: Subject to any disclaimer, the term of this patent is extended or adjusted under 35 U.S.C. 154(b) by 41 days.

(21) Appl. No.: 14/593,186

(22) Filed: Jan. 9, 2015

(65) Prior Publication Data

US 2016/0200258 A1 Jul. 14, 2016

(51) Int. Cl.
*B60R 7/04* (2006.01)

(52) U.S. Cl.
CPC .................................. *B60R 7/043* (2013.01)

(58) Field of Classification Search
CPC ............................. B60R 7/043; B60N 2/305
USPC ........................................... 296/37.14, 37.15
See application file for complete search history.

(56) References Cited

U.S. PATENT DOCUMENTS

| | | | | |
|---|---|---|---|---|
| 5,902,009 A * | 5/1999 | Singh | ...................... | B60R 7/043 296/37.15 |
| 6,106,044 A * | 8/2000 | Schlachter | .............. | B60R 7/043 296/37.15 |
| 6,386,612 B2 * | 5/2002 | Hofmann | ................ | B60R 7/043 224/275 |
| 6,540,279 B1 | 4/2003 | Bargiel | | |
| 6,644,709 B2 | 11/2003 | Inagaki et al. | | |
| 6,698,829 B1 | 3/2004 | Freijy et al. | | |
| 6,752,443 B1 * | 6/2004 | Thompson | ............... | B60N 2/30 296/24.34 |
| 6,981,730 B2 | 1/2006 | Bixby | | |
| 7,195,302 B2 | 3/2007 | Jovicevic | | |
| 8,096,610 B2 * | 1/2012 | Ganti | ..................... | B60N 2/305 224/275 |
| 8,770,661 B2 * | 7/2014 | Kalergis | .................. | B60R 7/043 296/37.15 |
| 9,016,749 B2 * | 4/2015 | Mueller | ................. | B60R 5/006 296/37.14 |
| 2003/0047957 A1 * | 3/2003 | Bargiel | .................... | B60R 7/043 296/65.05 |
| 2004/0149791 A1 * | 8/2004 | Tuel, Jr. | .................. | F41C 33/06 224/275 |
| 2005/0134076 A1 | 6/2005 | Storto et al. | | |
| 2006/0181103 A1 | 8/2006 | Khan et al. | | |
| 2006/0181104 A1 | 8/2006 | Khan et al. | | |
| 2013/0038080 A1 * | 2/2013 | Tate, Jr. | .................. | B60R 7/005 296/37.5 |
| 2014/0225403 A1 * | 8/2014 | Shimada | ................. | B60R 7/043 297/188.1 |

FOREIGN PATENT DOCUMENTS

| | | | | |
|---|---|---|---|---|
| DE | 10238888 A1 * | 3/2004 | ............. | B60N 2/305 |
| FR | 2748433 A1 * | 11/1997 | ............... | B60N 2/01 |

* cited by examiner

*Primary Examiner* — H Gutman
(74) *Attorney, Agent, or Firm* — Global IP Counselors, LLP

(57) ABSTRACT

A vehicle storage structure has a box structure with a cargo compartment, a lid and a locking mechanism. The lid is movable between a lowered orientation covering the cargo compartment and a raised orientation exposing the cargo compartment. The lid has a first section and a second section connected to one another via a hinge. The second section is pivotally movable such that with the first section in the lowered orientation, the second section pivots between a retracted position overlaying the first section and an extended position defining a flat cargo receiving surface. The locking mechanism is fixedly attached to the first section of the lid and is configured to releasably lock the lid in the lowered orientation.

19 Claims, 14 Drawing Sheets

VEHICLE STORAGE STRUCTURE

BACKGROUND

1. Field of the Invention

The present invention generally relates to a vehicle storage structure concealed beneath a seat of a vehicle. More specifically, the present invention relates to a storage structure that is exposed by movement of the vehicle seat such that a lid of the storage structure is movable to an extended position defining a flat cargo receiving surface.

2. Background Information

There are many differing types of storage structures installed at various locations within a passenger compartment of a vehicle structure. Such storage structures typically serve to store small personal effects and/or tools.

SUMMARY

One object of the disclosure is to provide a vehicle passenger compartment with a concealed storage structure that is multi-purpose.

Another object of the disclosure is to provide a vehicle passenger compartment with a concealed storage structure that can be locked to protect contents stored therein.

Yet another object of the disclosure is to provide a vehicle passenger compartment with a concealed storage structure that includes a lid structure that extends within the passenger compartment to form a flat cargo receiving surface.

In view of the state of the known technology, one aspect of the disclosure includes a vehicle storage structure having a vehicle floor, a vehicle seat assembly and a storage structure. The vehicle seat assembly is fixedly coupled to the vehicle floor. The storage structure is fixedly attached to the vehicle floor between the vehicle floor and a seating section of the vehicle seat assembly. The storage structure includes a box structure, a lid and a locking mechanism. The box structure has a cargo compartment. The lid includes a first section and a second section. The first section is movable between a lowered orientation covering the cargo compartment and a raised orientation exposing the cargo compartment. The second section is connected to the first section via a hinge. The second section is pivotally movable about the hinge relative to the first section such that with the first section in the lowered orientation, the second section pivots between a retracted position overlaying the first section and an extended position with the first section and the second section together defining a flat cargo receiving surface that extends forward of the vehicle seat assembly. The locking mechanism is fixedly attached to the first section of the lid and is configured to releasably lock the lid in the lowered orientation.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
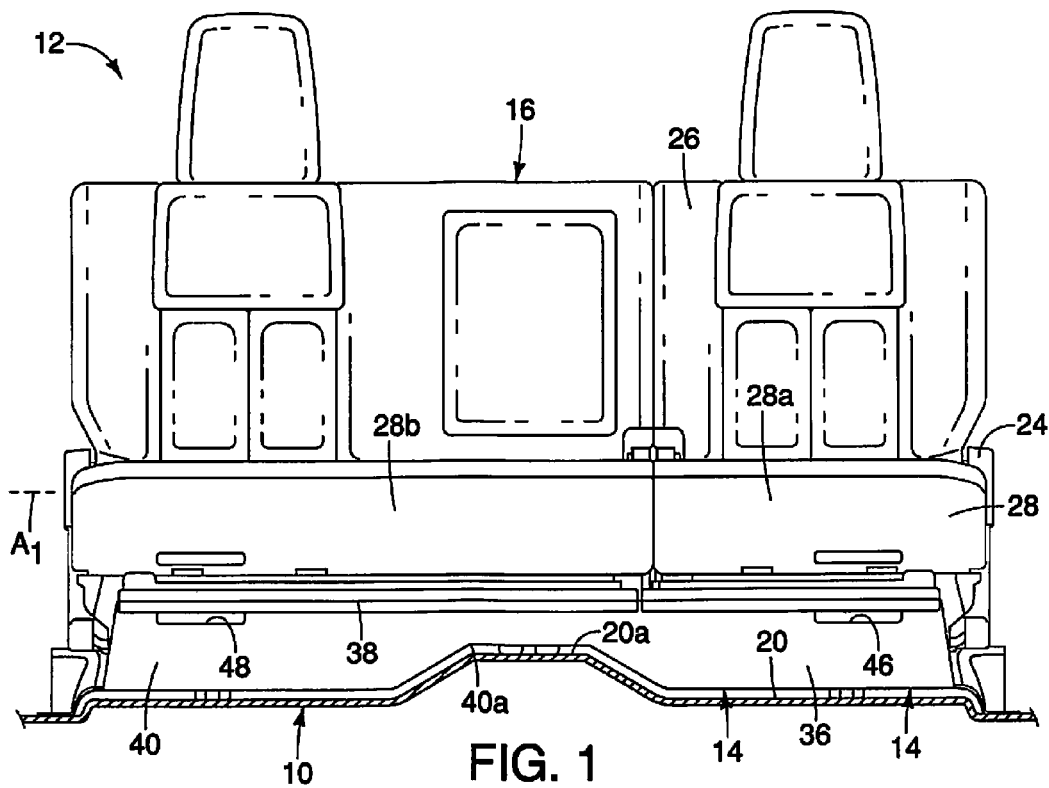
FIG. 1 is a front view of a rear seat assembly within a passenger compartment of a vehicle showing a storage structure installed to the floor of the vehicle beneath the rear seat assembly in accordance with a first embodiment.

Referring initially to FIG. 1, a vehicle 10 with a passenger compartment 12 including a storage structure 14 at least partially concealed beneath a rear seat assembly 16 is illustrated in accordance with a first embodiment. A description of the storage structure 14 is provided below after a brief description of the vehicle 10 and the passenger compartment 12.

Figure 2:
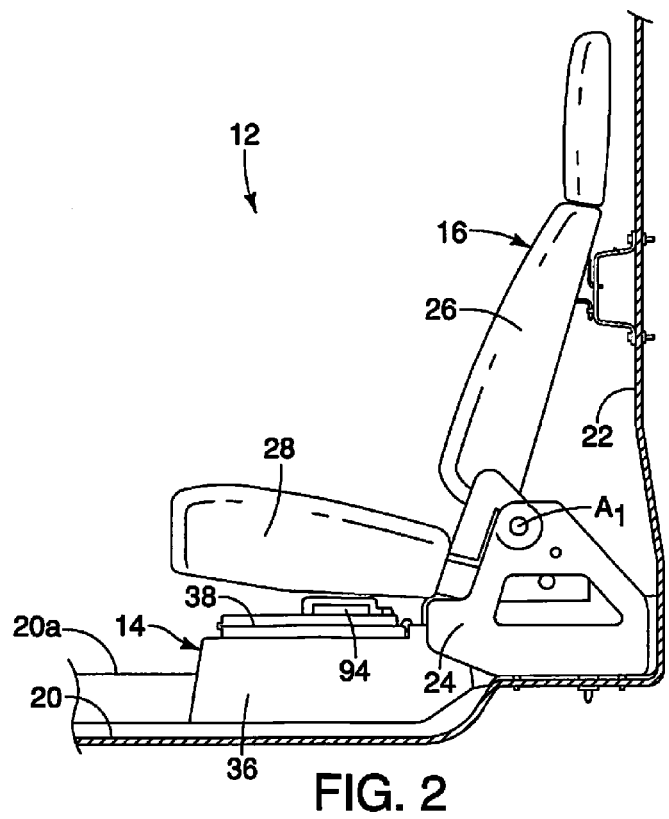
FIG. 2 is a side view of the rear seat assembly showing the storage structure installed to the floor of the vehicle beneath the rear seat assembly with a seating section of the rear seat assembly overlaying and at least partially concealing the storage structure in accordance with the first embodiment.
Figure 3:
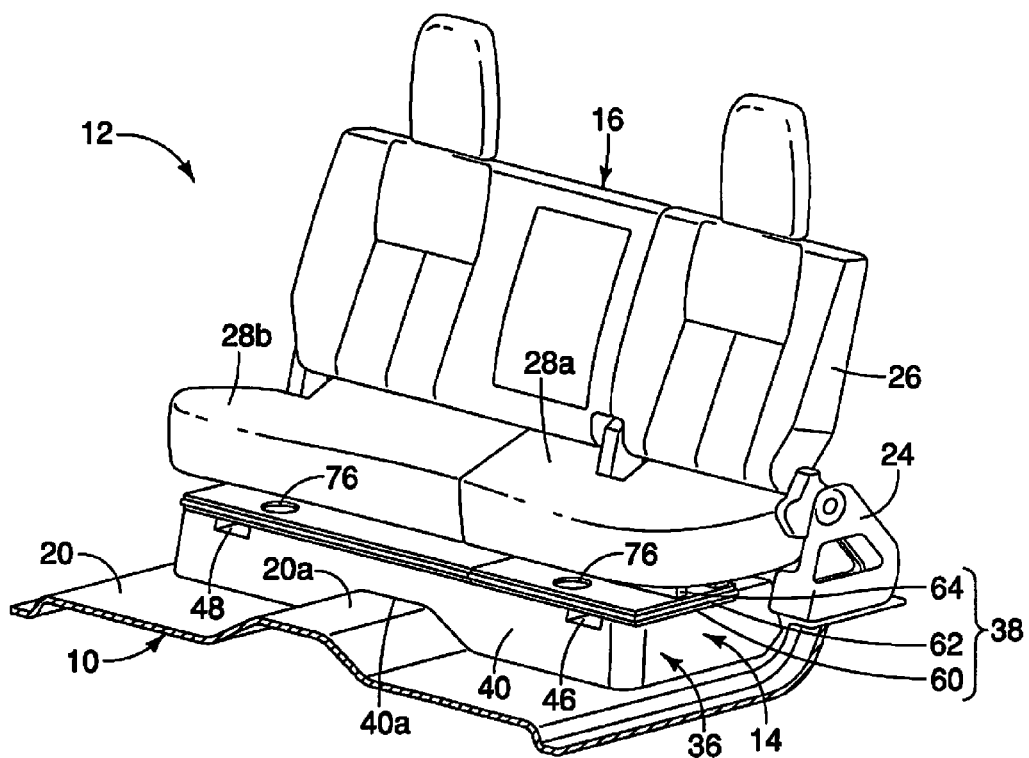
FIG. 3 is a perspective view of the rear seat assembly showing the storage structure installed to the floor of the vehicle beneath the rear seat assembly with the seating section of the rear seat assembly in a seating orientation in accordance with the first embodiment.
Figure 4:
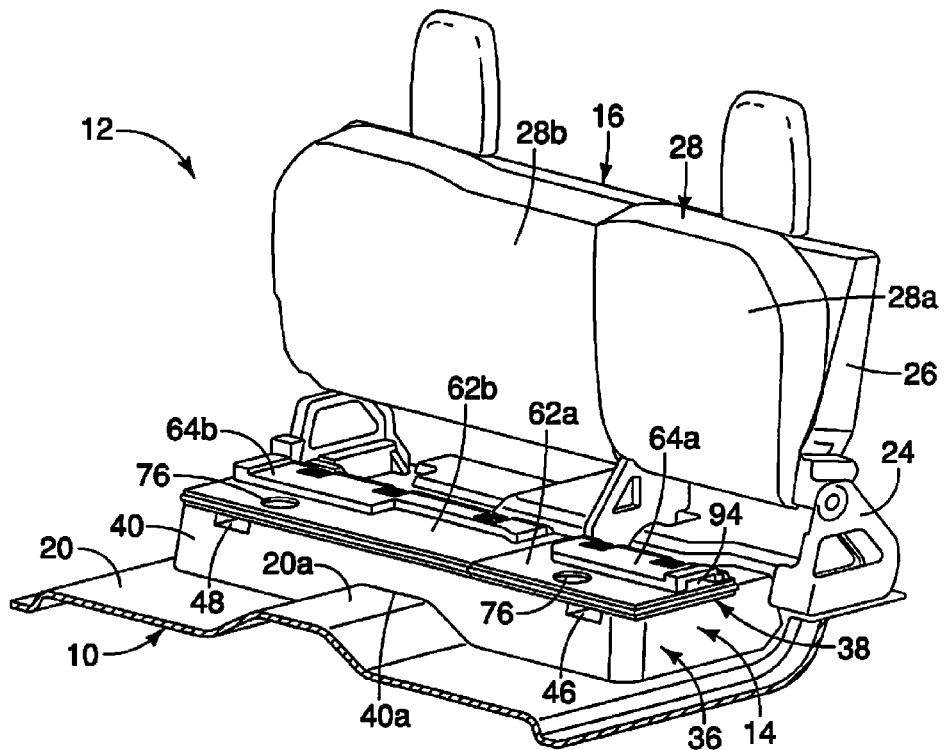
FIG. 4 is another perspective view of the rear seat assembly similar to FIG. 3 showing the seating section of the rear seat assembly in an upright retracted orientation exposing the storage structure in accordance with the first embodiment.

The vehicle 10 includes a floor 20 (FIGS. 1 and 2) and a rear wall 22 (FIG. 2). The floor 20 and the rear wall 22 at least partially define the passenger compartment 12 of the vehicle 10. In the depicted embodiment, the vehicle 10 is, for example, a pickup truck that includes a front row of seats (not shown) and the rear seat assembly 16. The rear seat assembly 16 is fixedly attached to the floor 20 by mechanical fasteners in a conventional manner.

As shown in FIG. 1, the floor 20 of the vehicle 10 can include various contours such that overall, the floor 20 is not flat. For example, the vehicle 10 can include a tunnel or hump that accommodates a drive shaft (not shown) and/or other mechanical components of the drive train (not shown) and power plant (not shown). As a result of such features, the floor 20 includes a central section 20a that has an uneven surface, as compared to the remainder of the floor 20. Specifically, the central section 20a has a non-planar contour that extends along a central area of the floor 20 and is raised above the remainder of the floor 20. As described further below, the storage structure 14 is shaped to overlay the floor 20 and the central section 20a.

As shown in FIG. 2, the rear seat assembly 16 includes a support structure 24, a seat back 26 and a seating section 28 that supports a vehicle occupant. The support structure 24 is fixed to the floor 20 via, for example, removable mechanical fasteners F, as shown in FIG. 2. The seat back 26 and the seating section 28 are both supported by the support structure 24 for pivotal movement, as described further below.

The seat back 26 and the seating section 28 can be single seat sections or, as shown in the drawings, can be divided into two portions 28a and 28b in a conventional 60-40 split. For example, the two portions 28a and 28b of the seating section 28 can be independently movable relative to one another between a seating orientation shown in FIGS. 1 and 2, and a retracted orientation (upwardly folded) shown in FIGS. 4-9. More specifically, the portion 28a can be raised and lowered independently from the portion 28b. Further, the portion 28b can be raised and lowered independently from the portion 28a. The support structure 24 includes support shafts (not shown) that define a pivot axis $A_1$. The seating section 28 pivots about the pivot axis $A_1$ when moved between the seating orientation and the retracted orientation. Since pivoting structures of seat assemblies are conventional structures, further description is omitted for the sake of brevity.

Figure 9:
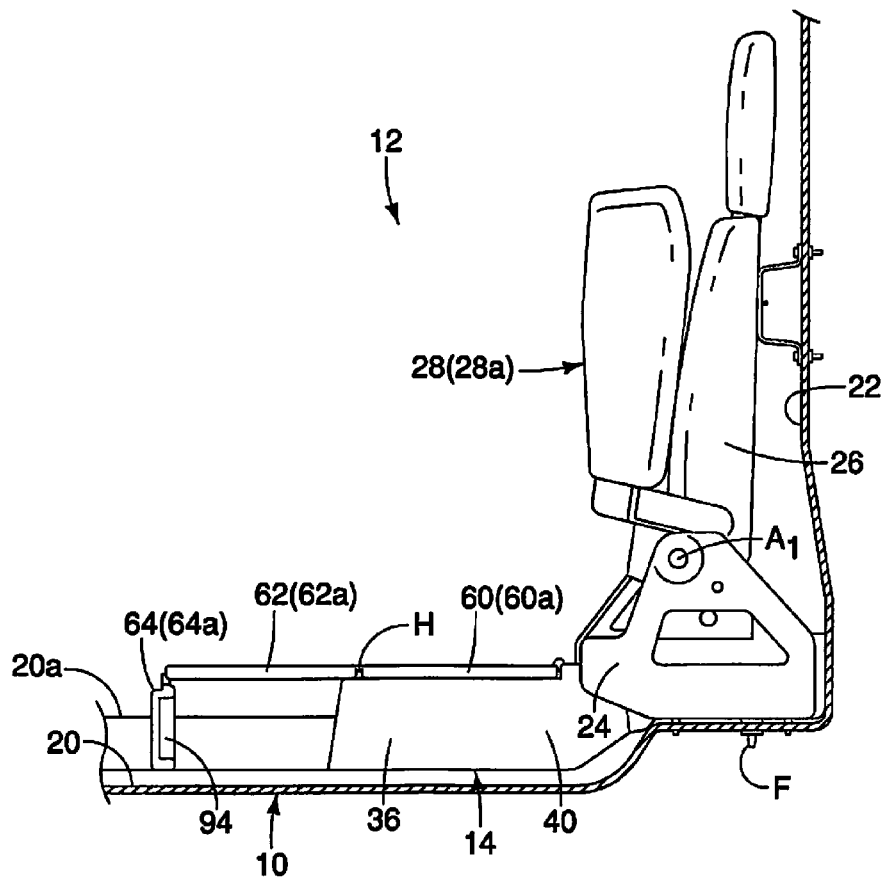
FIG. 9 is another side view of the rear seating assembly showing the seating section in the upright retracted position, the first section and the second section of the lid of the storage structure extended to form the flat cargo receiving surface, and the leg section extended in the supporting orientation supporting the second section of the lid above the vehicle floor in accordance with the first embodiment.
Figure 10:
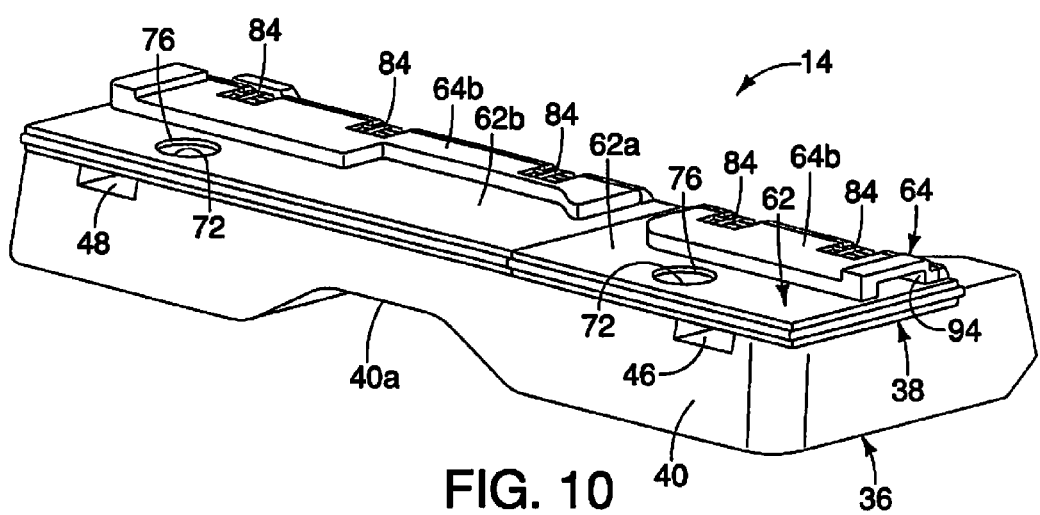
FIG. 10 is a first perspective view of the storage structure removed from the vehicle showing the first and section sections of the lid in a closed orientation covering the cargo compartments and showing the leg section in a folded or retracted orientation overlaying a portion of the second section of the lid in accordance with the first embodiment.
Figure 11:
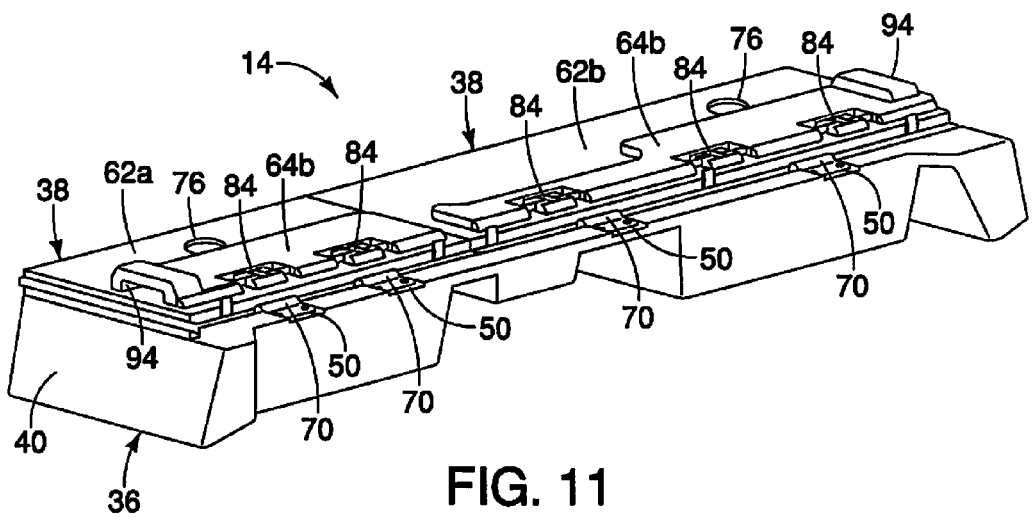
FIG. 11 is a second perspective view of the storage structure from a reverse angle as compared to FIG. 10, showing the first and section sections of the lid in the closed orientation covering the cargo compartments and the leg section in the retracted orientation overlaying the portion of the second section of the lid and further showing hinge structures defined by portions of the leg section and portions of the second section of the lid in accordance with the first embodiment.
Figure 12:
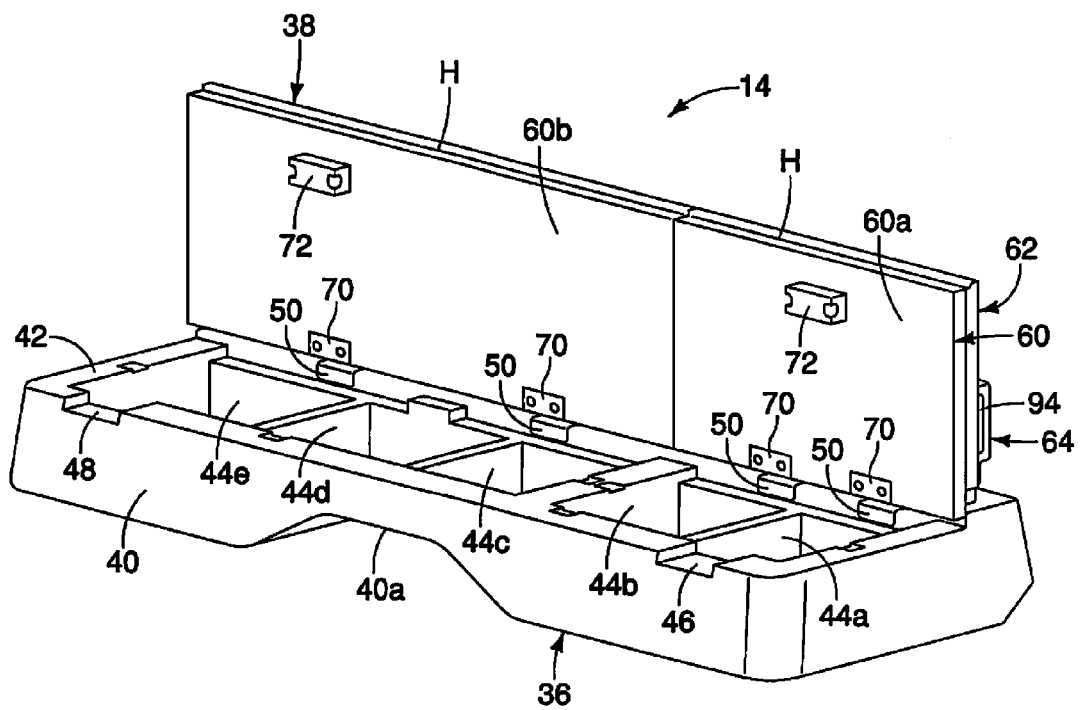
FIG. 12 is yet another perspective view of the storage structure similar to FIG. 10, showing the first and section sections of the lid in the open orientation exposing the cargo compartments in accordance with the first embodiment.
Figure 13:
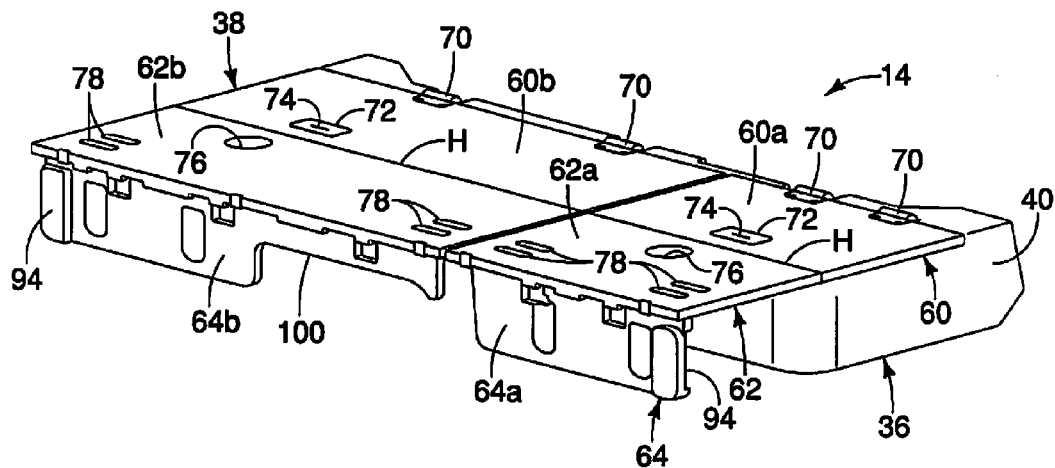
FIG. 13 is yet another perspective view of the storage structure similar to FIG. 12, showing the first and second sections of the lid extended forming the flat cargo receiving surface and the leg section extended in the supporting orientation in accordance with the first embodiment.
Figure 14:
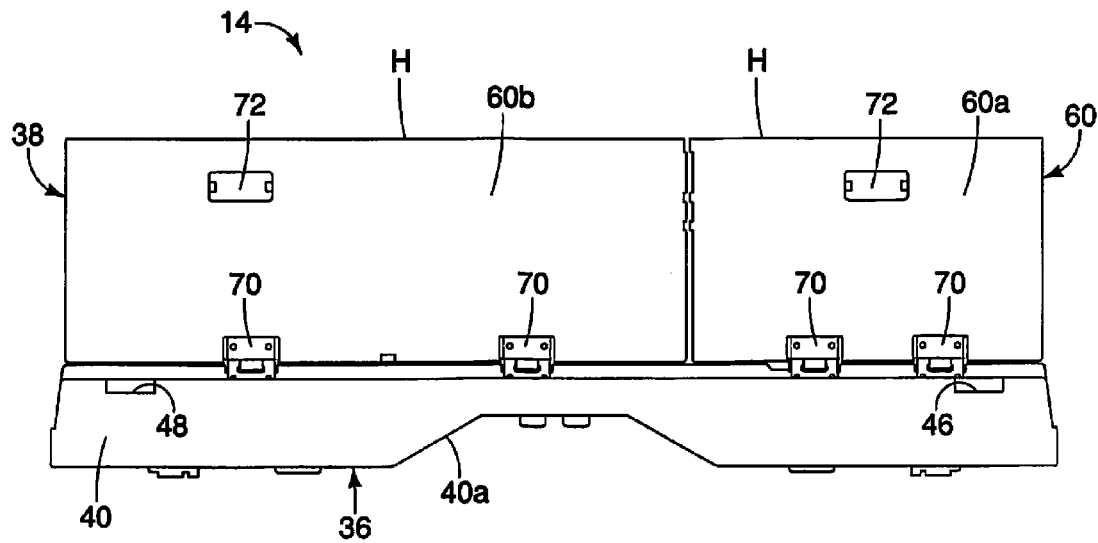
FIG. 14 is a front view of the storage structure showing a first side section and a second side section the lid in the open orientation in accordance with the first embodiment.

The two sections of the seat back 26 are also attached to the rear wall 22, as shown in FIG. 2. Further, the two sections of the seat back 26 are supported by the support structure 24 for pivotal movement between the seating orientation and the retracted orientation. However, the seat back 26 only undergoes slight movement when the rear seat assembly 16 is moved from the seating orientation (FIG. 2) and the retracted orientation (FIG. 9) to allow for movement of the seating section 28 to be fully upright when in the retracted orientation, as shown in FIG. 9.

It should be understood from the drawings and the description herein that the two portions of the seating section 28 (and the two portions of the seat back 26) of the rear seat assembly 16 can alternatively be built as a single seating section or bench seat arrangement, and raised and lowered as a single element. However, as mentioned above, the two portions 28a and 28b of the seating section 28 are spilt in two in a 60-40 (percent) arrangement and are independently raised and lowered between the seating orientation and the retracted orientation.

In the seating orientation, the seating section 28 overlays or covers the top of the storage structure 14. The storage structure 14 can be cosmetically designed to blend in with, for example, the appearance of the floor 20 and of various features of the passenger compartment 12. Further, with the seating section 28 in the seating orientation, the storage structure 14 is not noticeable and is essentially hidden from view by the seating section 28 and the front seats (not shown). However, with the seating section 28 raised to the retracted orientation, the storage structure 14 is fully exposed and is fully accessible.

A description of the storage structure 14 is now provided with reference to FIGS. 3-29.

Figure 5:
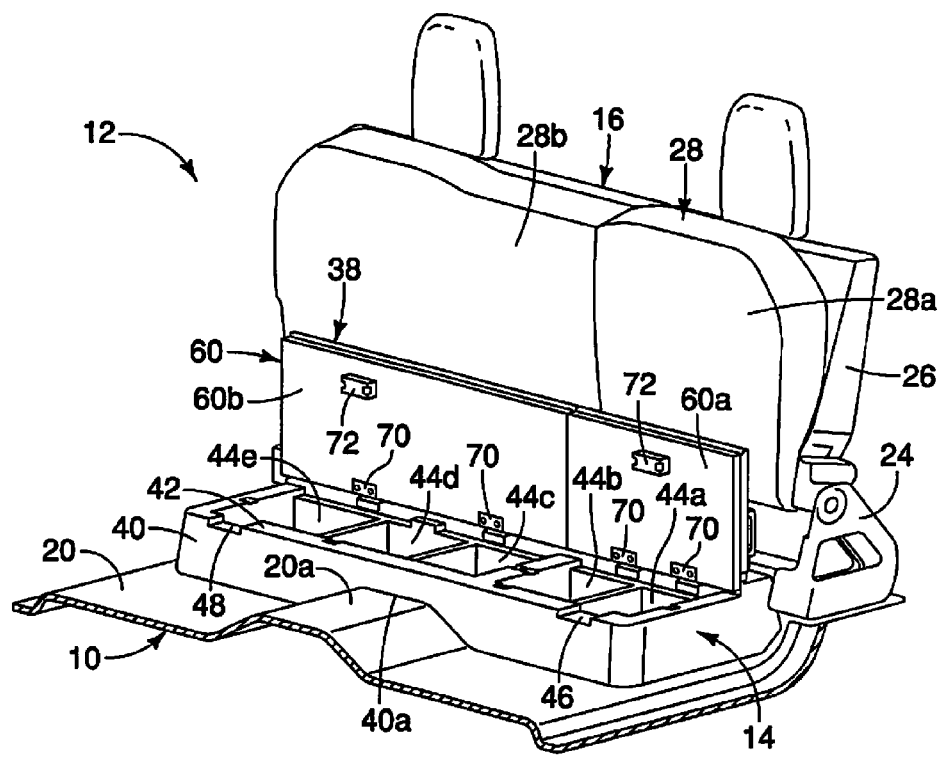
FIG. 5 is another perspective view of the rear seat assembly and the storage structure similar to FIGS. 3 and 4 showing the seating section in the upright retracted orientation and a lid of the storage structure in an open orientation exposing storage compartments within a box of the storage structure in accordance with the first embodiment.
Figure 7:
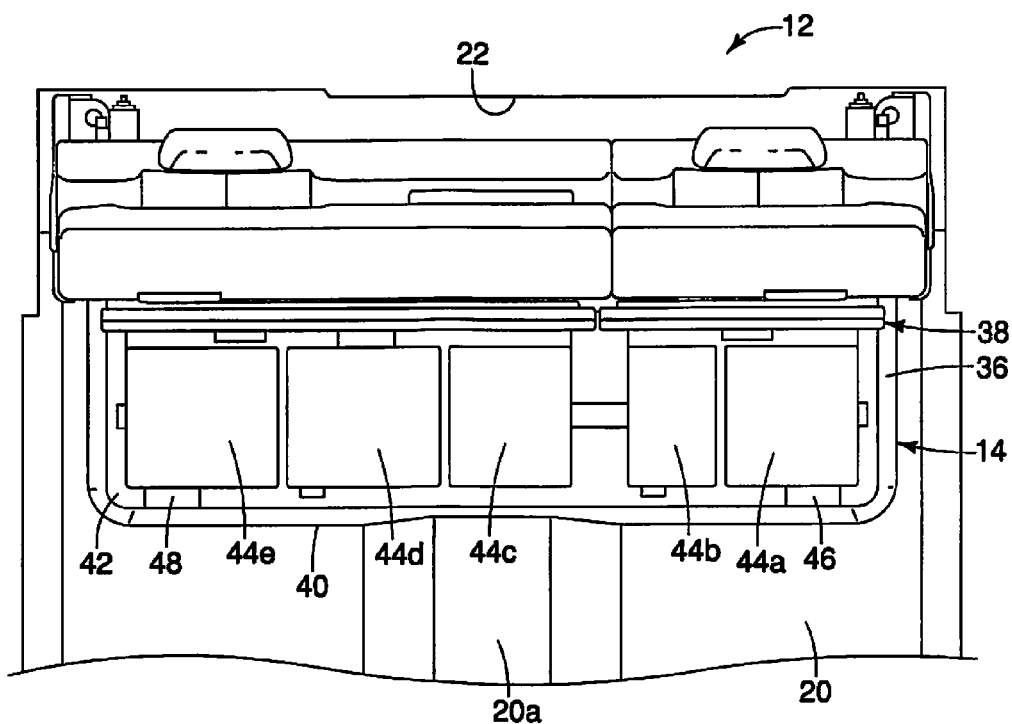
FIG. 7 is a top view of the rear seating assembly showing the seating section in the upright retracted position, as is also shown in FIG. 5, exposing the storage structure in accordance with the first embodiment.
Figure 8:
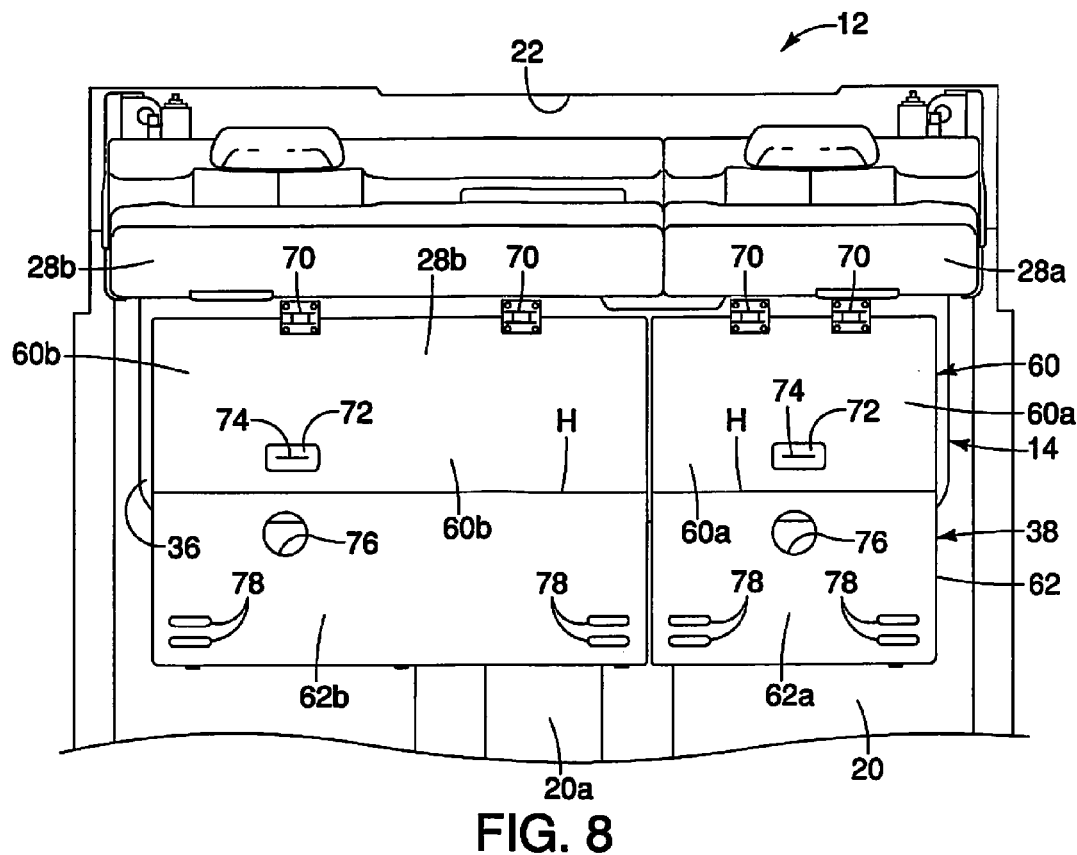
FIG. 8 is another top view of the rear seating assembly showing the seating section in the upright retracted position with the first section and the second section of the lid of the storage structure extended to form the flat cargo receiving surface, as is shown in FIG. 6, in accordance with the first embodiment.

The storage structure 14 basically includes a box structure 36 and a lid assembly 38. As shown in FIGS. 3-5, 7, 10-12, 14 and 24, the box structure 36 has an overall rectangular shape. In the depicted embodiment, the box structure 36 is made of a molded polymer or plastic material and shaped as shown. As shown in FIGS. 5 and 7, the box structure 36 includes an outer wall 40, an upper surface 42 and storage compartments 44a, 44b, 44c and 44d. The outer wall 40 wraps around the box structure 36 at least partially surrounding the box structure 36. Specifically, the outer wall 40 extends along a first side of the box structure 36, across the front side of the box structure 36 and along an opposite side of the box structure 36. Since the rear of the box structure 36 is hidden from view, the outer wall 40 at the rear of the box structure 36 is optional.

The upper surface 42 includes a first recess 46, a second recess 48 and a plurality of hinge attachment areas 50. The first recess 46 and the second recess 48 are located under the lid assembly 38 with the lid assembly 38 in a closed position. A vehicle occupant can insert fingers into either of the first and second recesses 46 and 48 in order to lift the lid assembly 38 from the closed position (FIGS. 1-4) to an open position (FIGS. 5 and 7). The closed position of the lid assembly 38 is also referred to herein below as a lowered orientation and the open position of the lid assembly 38 is also referred to as a raised orientation.

As shown in FIGS. 1, 3-5 and 10, the outer wall 40 includes a lower surface with a recessed area 40a that is centrally located. The recessed area 40a of the lower surface of the wall 40 is contoured to mate with an uneven non-planar contour of the central section 20a of the floor 20. It should be understood from the drawings and the description herein that that the lower surface of the wall 40 can include other contours to mate with other features (not shown) of the floor 20 in order to have a flush fit with the floor 20.

Figure 24:
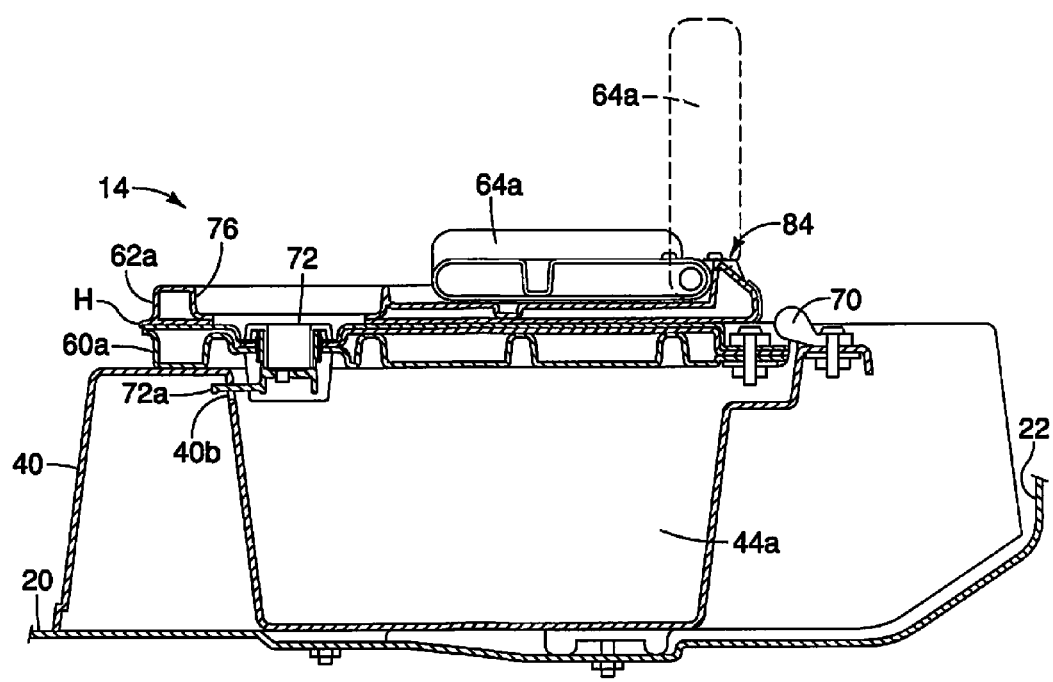
FIG. 24 is a cross-sectional view of the storage structure with the lid in the closed orientation, showing the lock of the first section of the lid locking the lid to the box structure in accordance with the first embodiment.

As shown in FIG. 24, the box structure 36 is fixedly attached to the floor 20 by removable mechanical fasteners F. Consequently, the storage structure 14 can be removed from the vehicle 10 once the fasteners F are unscrewed and removed and reinstalled later.

The lid assembly 38 basically includes a first lid section 60, a second lid section 62 and a leg section 64. The first lid section 60 can be a single panel or, as shown in the depicted embodiment in the drawings, can be split into a first side panel 60a and a second panel 60b. Similarly, the second lid section 62 can be a single panel or part. However, as shown in the depicted embodiment in the drawings, can be split into a first side part 62a and a second part 62b. Further, the leg section 64 can be a single part or, as shown in the depicted embodiment in the drawings, can be split into a first leg part 64a and a second leg part 64b. In the depicted embodiment, the first lid section 60, the second lid section 62 and the leg section 64 are split in a 60-40 arrangement, where the first side panel 60a, the first side part 62a and the first leg part 64a cover approximately 40 percent of the box structure 36 and the second side panel 60b, the second side part 62b and the second leg part 64b cover approximately 60 percent of the box structure 36. Further, the first side panel 60a covers the storage compartments 44a and 44b with the lid assembly 38 in the closed position. The second side panel 60b covers the storage compartments 44c, 44d and 44e with the lid assembly 38 in the closed position.

The first side panel 60a can be moved from the closed position to the open position independently from movement of the second side panel 60b. Similarly, the second side panel 60b can be moved from the closed position to the open position independently from movement of the first side panel 60a. In the description below, reference to the first lid section 60 applies equally to the first side panel 60a and the second side panel 60b. While the first side panel 60a and the second side panel 60b have differing overall dimensions, they have several similar features and several identical features, as described below.

Similarly, reference to the second lid section 62 applies equally to each of the first side part 62a and the second side part 62b. While the first side part 62a and the second side part 62b have differing overall dimensions, they have essentially identical features, as described below.

Figure 6:
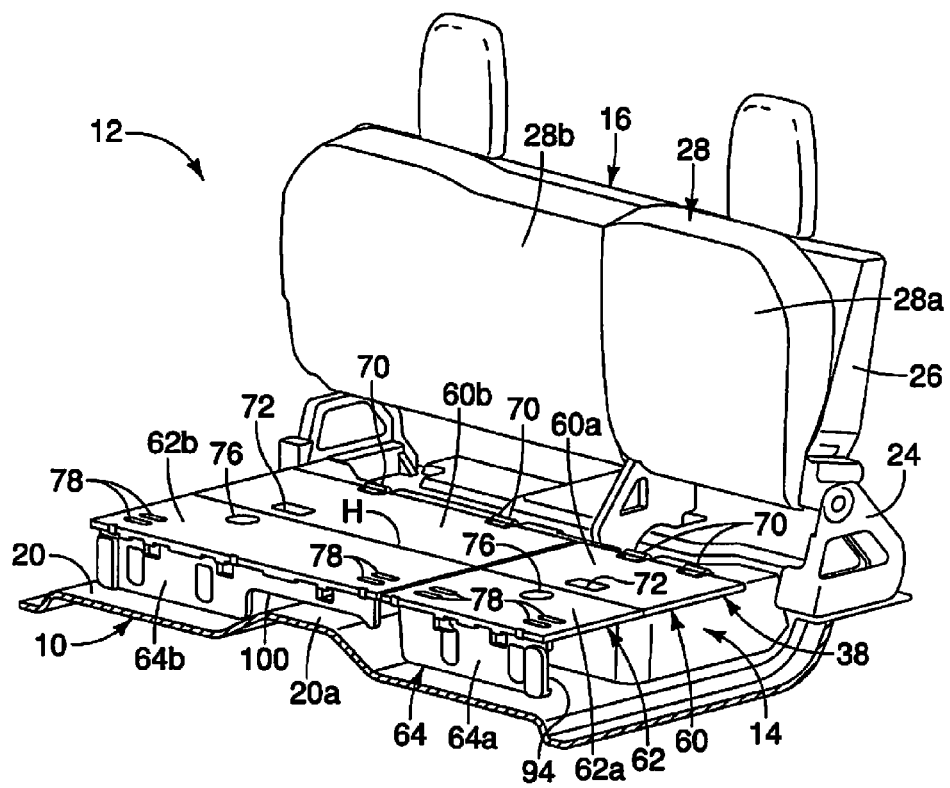
FIG. 6 is yet another perspective view of the rear seat assembly and the storage structure similar to FIGS. 3-5 showing a first section, a second section and a leg section of the lid of the storage structure with the first and second sections of the lid extended to form a flat cargo receiving surface and the leg section extended in a supporting orientation supporting the second section of the lid above the vehicle floor in accordance with the first embodiment.

The second lid section 62 is fixed to the first lid section 60 via a living hinge H, as is shown in FIGS. 5 and 6. More specifically, the first side part 62a is attached to the first side panel 60a via a first portion of the living hinge H and the second side part 62b is attached to the first side panel 60b via another portion of the living hinge H. Hence, the second lid section 62 (the first side part 62a and the second side part 62b) pivot about the living hinge H relative to the first lid section 60 (the first side panel 60a and the second side panel 60b). In the depicted embodiment, the first lid section 60, the living hinge H and the second lid section 62 are formed as a single, unitary structure. More specifically, the first side panel 60a and the first side part 62a are unitarily formed with the living hinge H therebetween, and the second side panel 60b and the second side part 62b are unitarily formed with the living hinge H therebetween. In the depicted embodiment, the lid assembly 38 is made of a molded material, such as a plastic or polymer material.

The first lid section 60 (the first side panel 60a and the second side panel 60b) is fixed to the box structure 36 via a plurality of mechanical hinges 70 as shown in FIGS. 7-8, 12-14 and 27. More specifically, the first lid section 60 pivots about the hinges 70 from the closed position covering the box structure 36 (FIGS. 1-4) to the open position exposing the storage compartments 44a-44e (FIGS. 5 and 7).

It should be understood from the drawings and the description herein that due to the connection of living hinge H between the first lid section 60 and the second lid section 62, the second lid section 62 moves with the first lid section 60.

Figure 25:
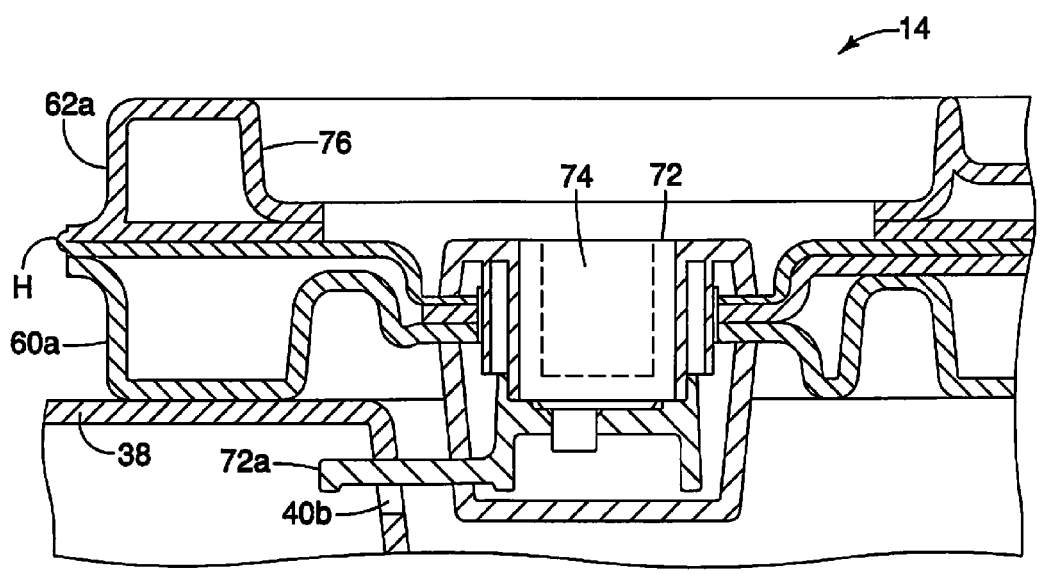
FIG. 25 is a cross-sectional view of the lock of the first section of the lid locking the lid to the box structure in accordance with the first embodiment.
Figure 26:
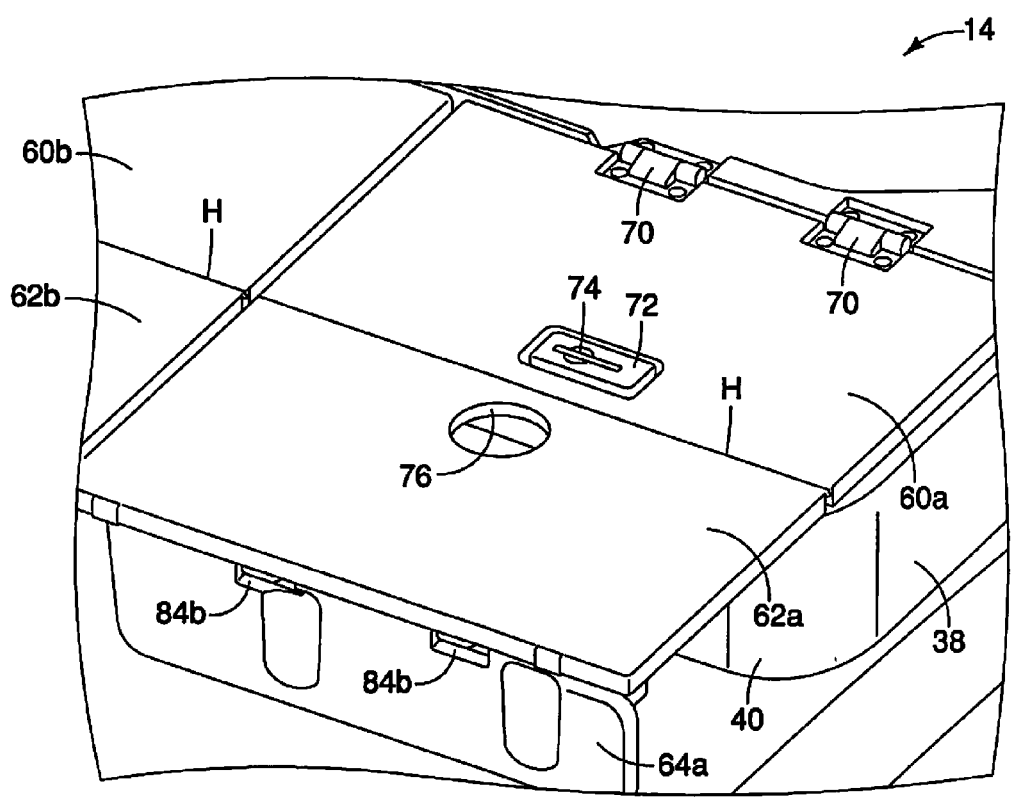
FIG. 26 is a perspective view of a portion of the storage structure showing the first section of the lid and the second section of the lid in the extended orientation in accordance with the first embodiment.
Figure 27:
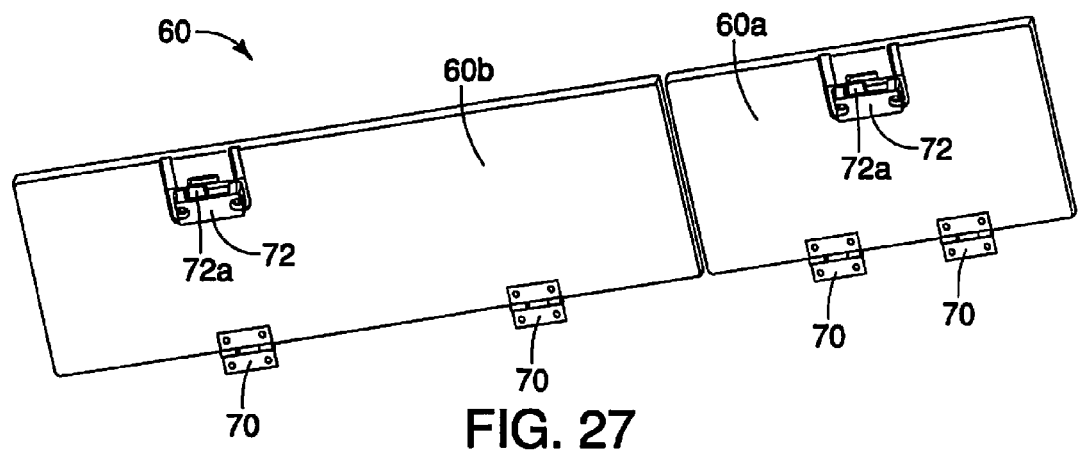
FIG. 27 is a perspective view of the lid of the storage structure showing both the first side panel and the second side panel of the lid in accordance with the first embodiment.
Figure 28:
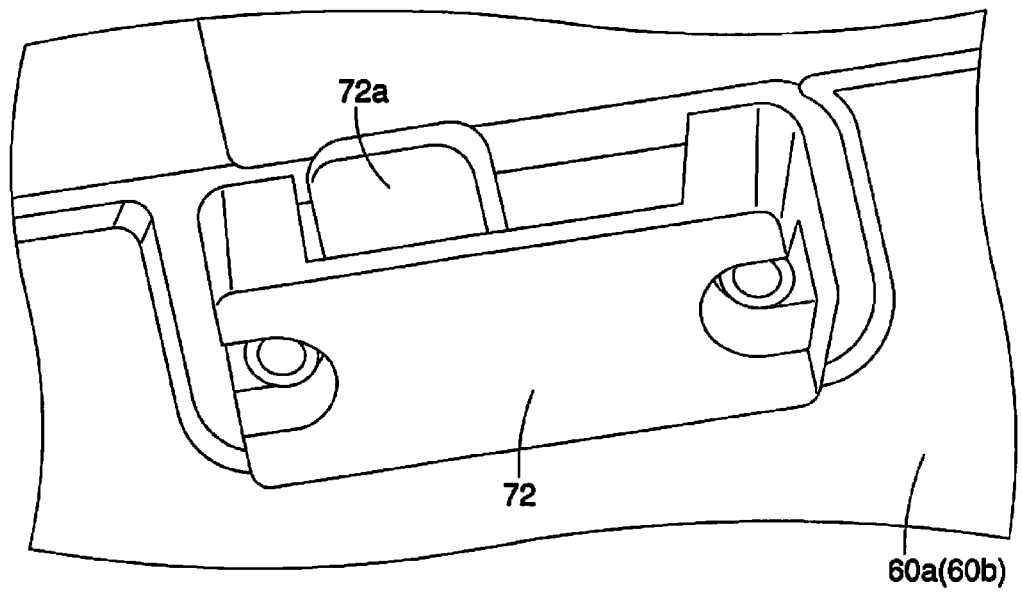
FIG. 28 is a perspective view of the lock of the first section of the lid shown in a locking orientation in accordance with the first embodiment.
Figure 29:
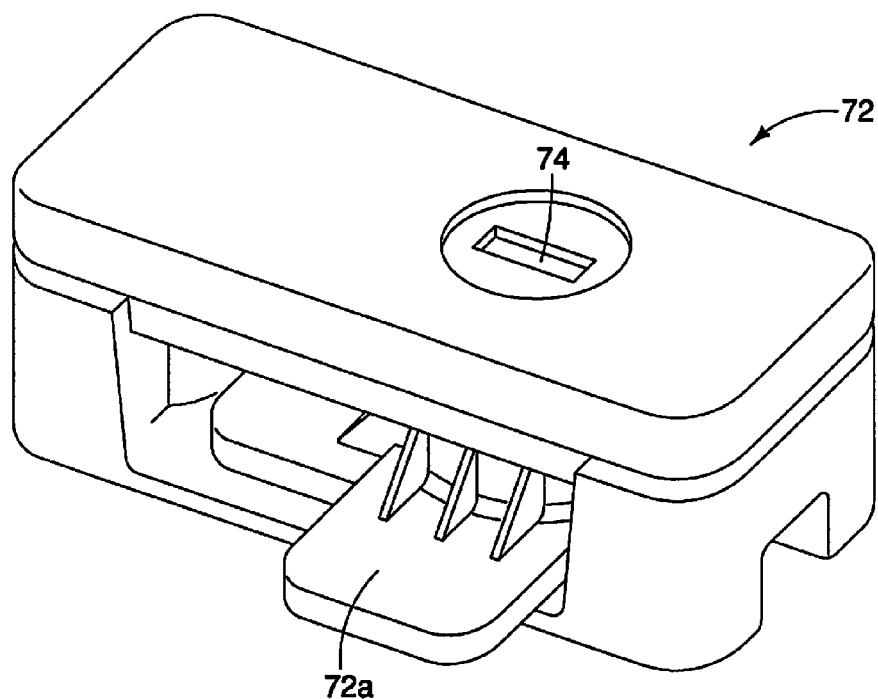
FIG. 29 is a perspective view of the lock shown removed from the lid and in the locking orientation in accordance with the first embodiment.

The first lid section 60 includes a locking mechanism 72. The locking mechanism 72 is shown in FIGS. 25-29. The locking mechanism 72 includes a key hole 74 in an upper surface thereof and a bolt 72a. As shown in FIGS. 24 and 25, the box structure 36 includes a recess 40b that receives the bolt 72a with the locking mechanism 72 in a locking orientation. Using a key (not shown) the bolt 72a can be moved from the locking orientation to an unlocked orientation (not shown). Since the locking mechanism 72 is a conventional component, further description is omitted for the sake of brevity. As is shown in the drawings, there are two locking mechanisms 72, one installed to the first side panel 60a and the second installed to the second side panel 60b. Hence, the separate areas of the storage structure 14 can be independently locked to secure valuables therein.

The second lid section 62 is pivotally movable about the living hinge H relative to the first lid section 60. Specifically, with the first lid section 60 in the lowered orientation or closed position, the second lid section 62 pivots between a retracted position overlaying the first lid section 60 (FIGS. 1-4) and an extended position (FIGS. 6, 8, 9, 13 and 26). In the extended position (FIGS. 6, 8, 9, 13 and 26) the first lid section 60 and the second lid section 62 together define a flat cargo receiving surface that extends forward of the box structure 36 and the rear seat assembly 16.

The second lid section 62 includes apertures 76 that expose the locking mechanisms 72 with the second lid section 62 in the retracted position, as shown in FIGS. 3, 10 and 23-25. More specifically, each of the first side part 62a and the second side part 62b includes a corresponding one of the apertures 76.

Each of the first side part 62a and the second side part 62b of the second lid section 62 includes corresponding pairs of recesses 78 that define cargo strap receiving locations or cargo tie-downs for securing cargo (not shown) to the lid assembly 38.

The second lid section 62 retains the leg section 64 thereto. Specifically, the first side part 62a retains a first leg part 64a and the second side part 62b retains the second leg part 64b. Further, the first leg part 64a is supported to the first side part 62a for pivotal movement with respect thereto. Similarly, the second leg part 64b is supported to the second side part 62b for pivotal movement with respect thereto between a retracted position (FIGS. 2, 4, 10 and 11) and an extended portion (FIGS. 6, 9, 13 and 26). In the extended position with both parts of the second lid section 62 in their extended positions defining the flat cargo receiving surface, the first leg part 64a and the second leg part 64b contact the floor 20 and support the second lid section 62 and any cargo placed on the flat cargo receiving surface.

Figure 17:
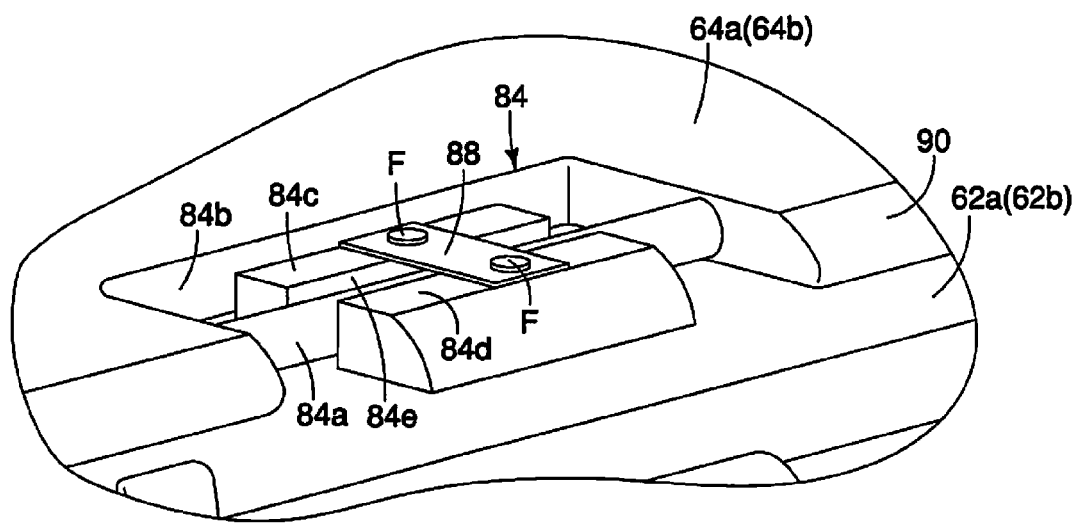
FIG. 17 is a first perspective view of one of the hinge structures that pivotally connects the leg section to the lid of the storage structure in accordance with the first embodiment.
Figure 20:
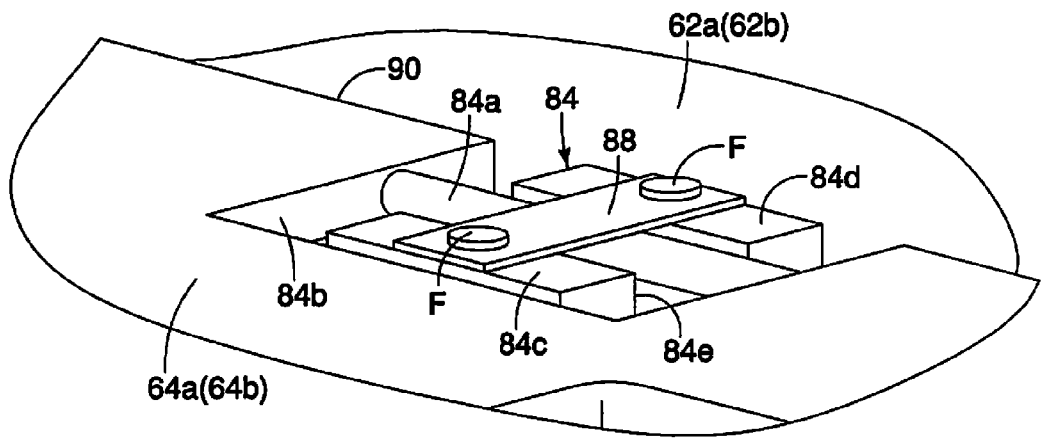
FIG. 20 is a second perspective view of the hinge structure that pivotally connects the leg section to the lid of the storage structure in accordance with the first embodiment.
Figure 21:
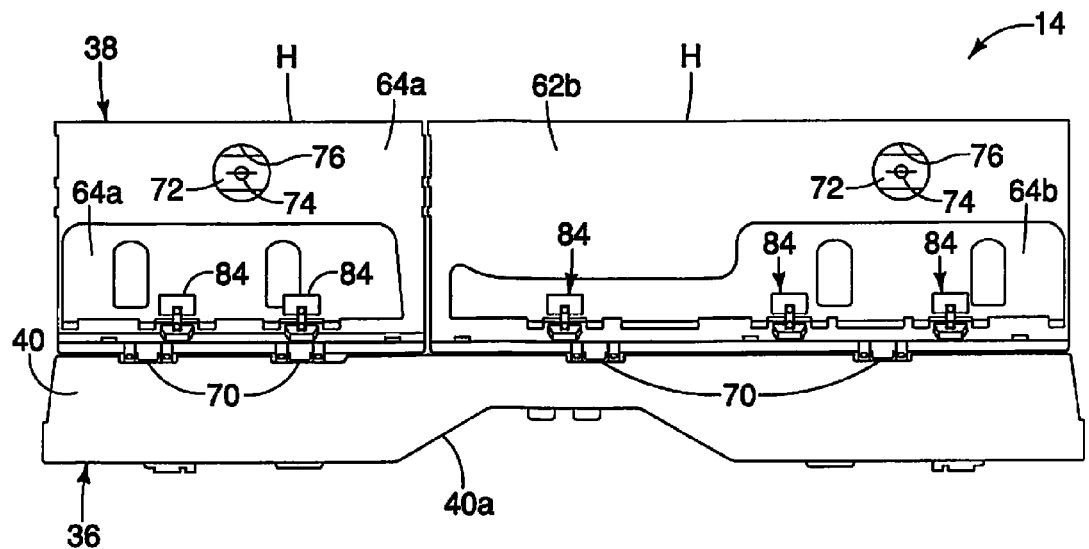
FIG. 21 is a rear view of the storage structure showing the lid in the open position and showing the hinge structures that pivotally connect the leg section to the lid of the storage structure in accordance with the first embodiment.
Figure 22:
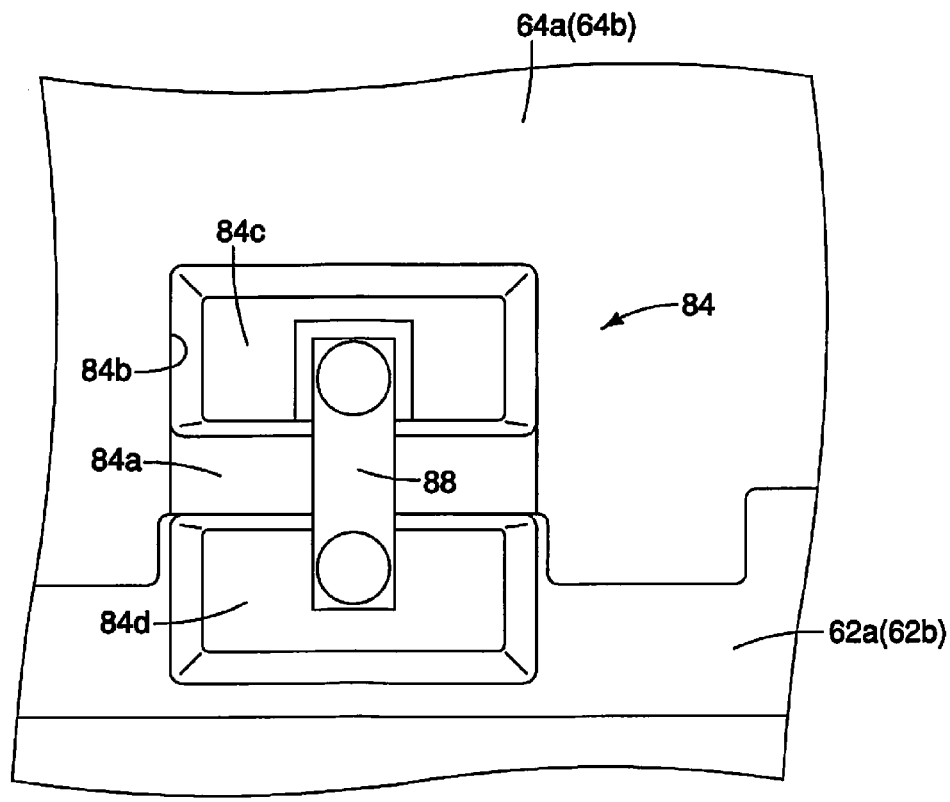
FIG. 22 is a plan view of the hinge structure that pivotally connects the leg section to the lid of the storage structure in accordance with the first embodiment.
Figure 23:
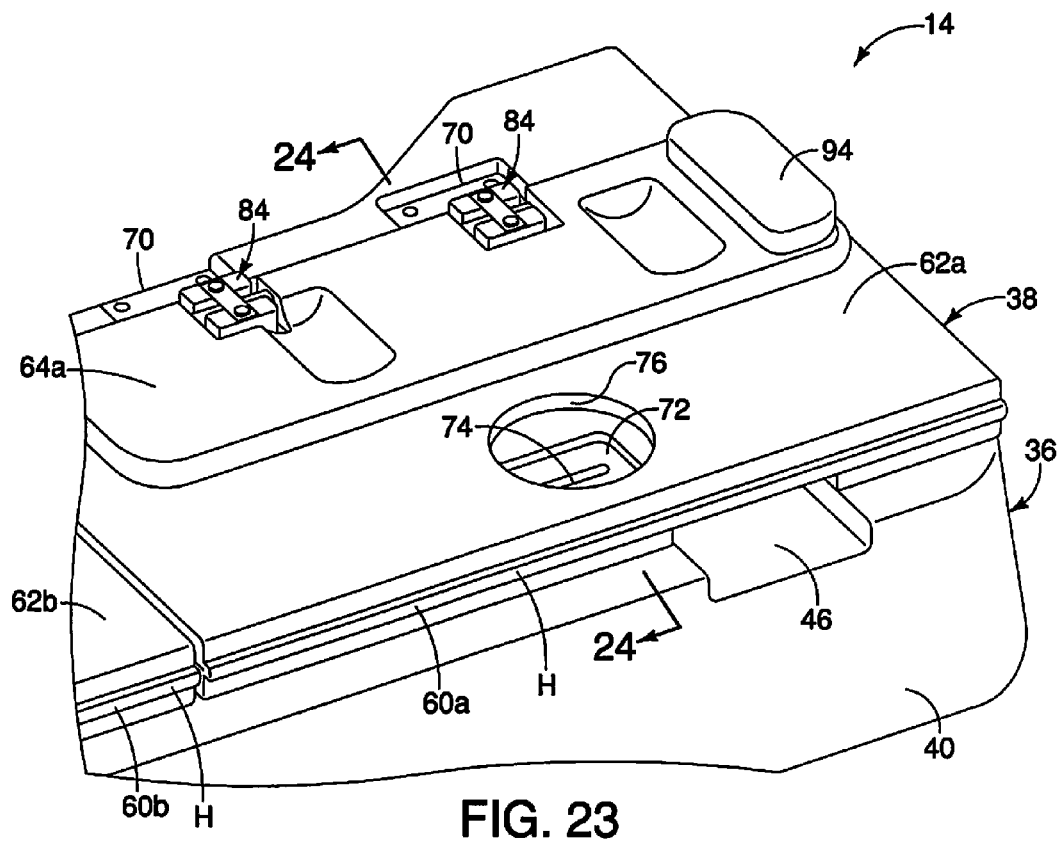
FIG. 23 is a perspective view of a portion of the storage structure showing the first section of the lid and the second section of the lid in the closed orientation, with an opening in the second section aligning with and exposing a lock in the first section of the lid in accordance with the first embodiment.

More specifically, there are five hinge structures 84 (pivot structures) defined between the leg section 64 and the second lid section 62. One of the hinge structures 84 is depicted in FIGS. 17 and 20. There are two hinges 84 defined between the first side part 62a and the first leg part 64a and three hinge structures 84 defined between the second side part 62b and the second leg part 64b. The five hinge structures 84 are basically the same, therefore description of one of the hinge structures 84 applies equally to all.

As shown in FIGS. 15, 16, 17 and 20, each of the first leg part 64a and the second leg part 64b of the leg section 64 include a first edge 90 and a second edge 92. The first edge 90 is attached to a corresponding one of the second lid parts 62a and 62b for pivotal movement between the retracted position and the extended position via the hinge structures 84. More specifically, the first edges 90 are formed with shaft portions 84a with a corresponding opening 84b being defined adjacent each of the shaft portion 84a.

Figure 18:
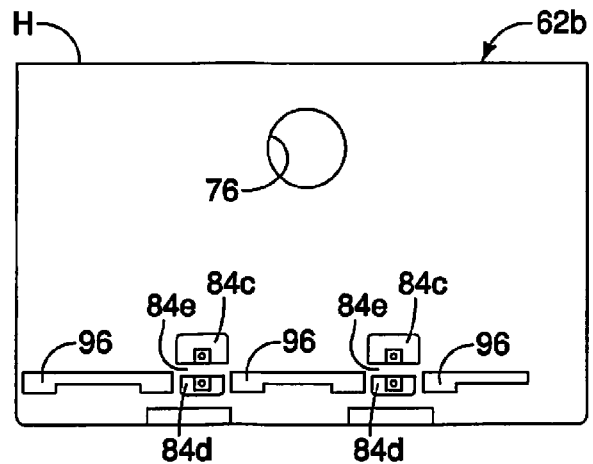
FIG. 18 is a first side part of the second section of the lid removed from the storage structure showing hinge support parts with a shaft receiving recess defined therebetween that partially define the hinge structures in accordance with the first embodiment.
Figure 19:
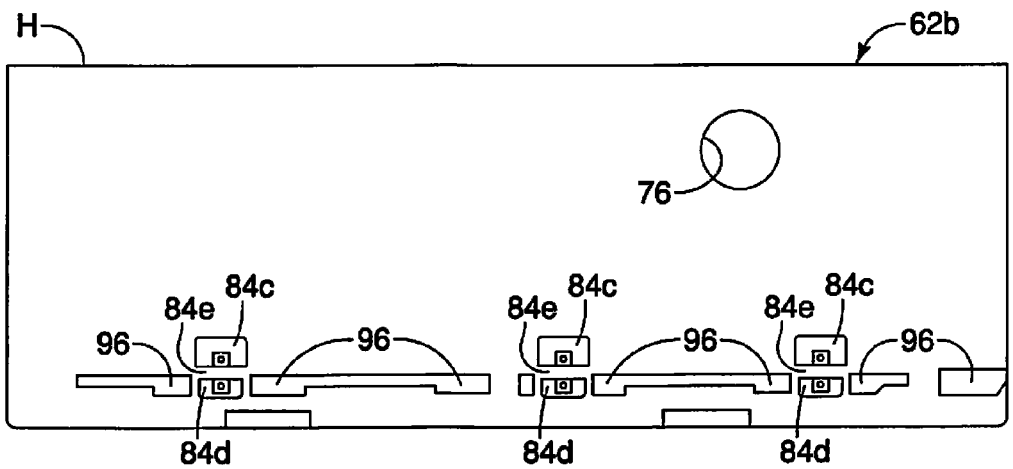
FIG. 19 is a second side part of the second section of the lid removed from the storage structure showing hinge support parts with a shaft receiving recess defined therebetween that partially define the hinge structures in accordance with the first embodiment.

As shown in FIGS. 18 and 19, each of the first side part 62a and the second side part 62b is formed with a pair of projections 84c and 84d, with a shaft receiving recess 84e defined therebetween.

When fully assembled, the shaft portions 84a are inserted into the shaft receiving recesses 84e and are held in position by rigid straps 88 fastened to the projections 84c and 84d, as shown in FIGS. 17 and 20. The shaft receiving recesses 84e define bearing journals about which the shaft portions 84a and the first and second leg parts 64a and 64b pivot.

Figure 15:
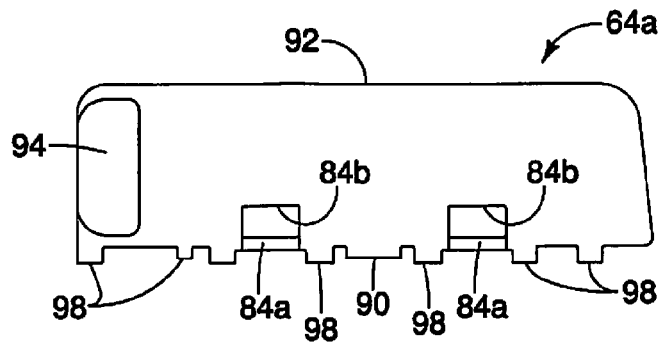
FIG. 15 is a plan view of a first leg part of the leg section shown removed from the lid showing shafts unitarily formed with the remainder of the first leg part of the leg section, the shafts partially defining the hinge structure in accordance with the first embodiment.
Figure 16:
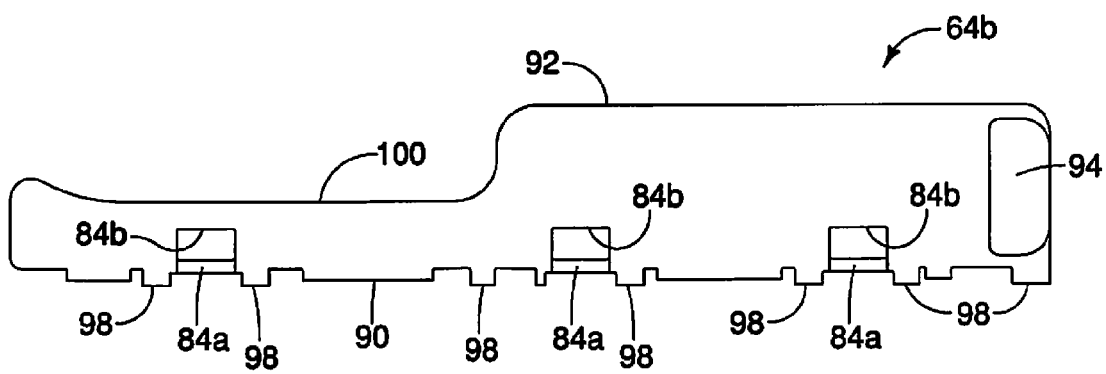
FIG. 16 is a plan view of a second leg part of the leg section shown removed from the lid showing shafts unitarily formed with the remainder of the second leg part of the leg section, the shafts partially defining the hinge structure in accordance with the first embodiment.

At opposite ends of each of the first and second leg parts 64a and 64b, a recess is formed that defines handles 94 that can be gripped by a vehicle occupant to lift the first and second leg parts 64a and 64b. As shown in FIGS. 15 and 16, the shaft portions 84a extend in directions that are generally parallel to the first edges 90.

As shown in FIGS. 18 and 19, the first and second side parts 62a and 62b further include depressions 96. The first edges 90 of the first and second leg parts 64a and 64b include projections 98. The projections 98 engage the depressions 96 as the first and second leg parts 64a and 64b are moved to the extended position providing resistance to movement, thereby retaining the first and second leg parts 64a and 64b in the extended position.

The second edges 92 of the first and second leg parts 64a and 64b are shaped and configured to contact the floor 20 to support the first and second side parts 62a and 62b of the second lid section 62 when they are in the extended orientation. The second edge 92 of the second leg part 64b includes a recessed portion 100 that corresponds to the overall shape of the floor 20, and in particular the central section 20a of the floor 20.

Hence, the storage structure 14 is a multi-purpose assembly. Specifically, the storage structure 14 can be used to store cargo, tools and/or valuables. The storage structure 14 is at least partially hidden beneath the seat assembly 16 and is therefore has hidden or concealed storage areas. The storage structure 14 can also be locked to secure the contents of the cargo areas within. Further, the apertures 76 align with the locking mechanisms 72 with the lid assembly 38 in a fully closed orientation. Consequently, the locking mechanisms 72 can be unlocked without moving any portion of the lid assembly 38.

Figure 30:
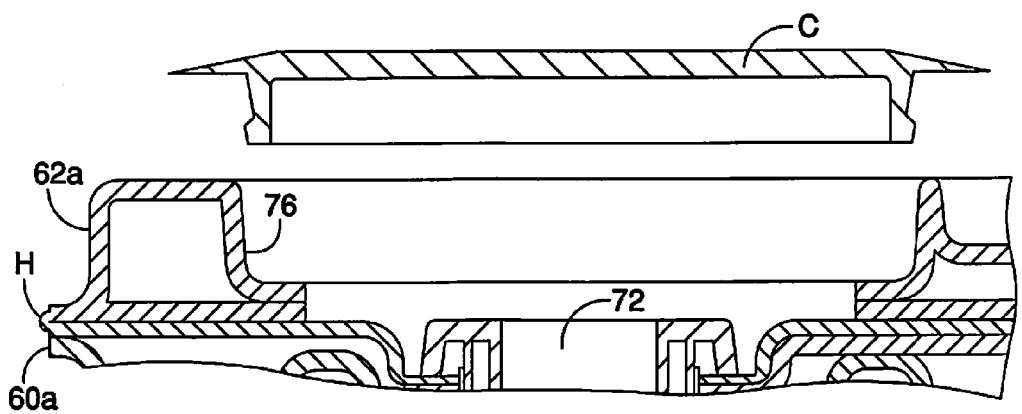
FIG. 30 is a cross-sectional view of a portion of the lid showing a removable cover insertable into the opening in the second section of the lid to conceal the lock in the first section of the lid in accordance with a modification to the first embodiment.
Figure 31:
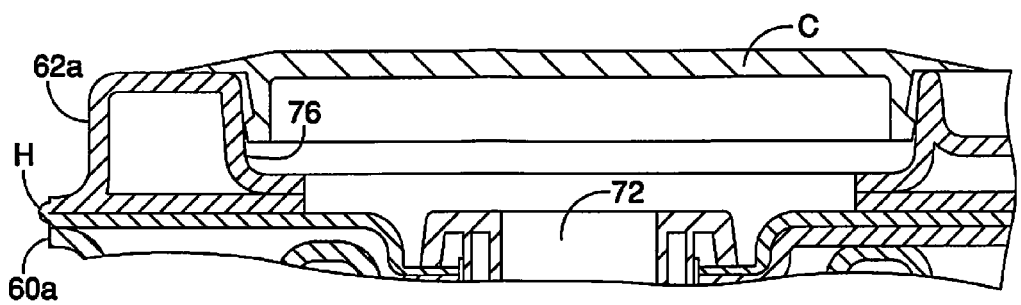
FIG. 31 is another cross-sectional view of the portion of the lid similar to FIG. 30, showing the removable cover inserted into the opening in the second section of the lid concealing the lock in the first section of the lid in accordance with the modification to the first embodiment.

In a modification to the first embodiment shown in FIGS. 30 and 31, an optional cover C can be inserted into the apertures 76, thus covering the apertures 76 and concealing the locking mechanisms 72 with the second lid section 62 in the retracted or closed orientation.

In the depicted modification shown in FIGS. 30 and 31, the cover C is completely removable. However, in a further modification, the cover C can be attached to the second lid section 62 via a hinge structure (not shown) that allows the cover C to move from a closed position covering the aperture 76 and an open position exposing the aperture 76 and the locking mechanisms 72.

Various vehicle elements are conventional components that are well known in the art. Since such vehicle elements are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle storage structure. Accordingly, these terms, as utilized to describe the present invention should be interpreted relative to a vehicle equipped with the vehicle storage structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle storage structure comprising:
    a vehicle floor;
    a vehicle seat assembly fixedly coupled to the vehicle floor;
    a storage structure fixedly attached to the vehicle floor between the vehicle floor and a seating section of the vehicle seat assembly, the storage structure including:
        a box structure having a cargo compartment;
        a lid including a first section and a second section, the first section being movable between a lowered orientation covering the cargo compartment and a raised orientation exposing the cargo compartment, the second section being connected to the first section via a hinge, the second section being pivotally movable about the hinge relative to the first section such that with the first section in the lowered orientation, the second section pivots between a retracted position overlaying the first section and an extended position with the first section and the second section together defining a flat cargo receiving surface that extends forward of the vehicle seat assembly, the second section of the lid including an aperture; and
        a locking mechanism fixedly attached to the first section of the lid and being configured to releasably lock the lid in the lowered orientation, with the aperture of the second section of the lid exposing the locking mechanism with the second section in the retracted position.

2. The vehicle storage structure according to claim 1, wherein
    the second section includes a removable cover that attaches to the second section covering the aperture and concealing the locking mechanism with the second section in the retracted position.

3. The vehicle storage structure according to claim 1, wherein
    the hinge between the first section and the second section is a living hinge unitarily formed with the first section and the second section.

4. The vehicle storage structure according to claim 3, wherein
    the living hinge between first section and the second section of lid is located adjacent a front edge of the box structure with the lid in the lowered orientation.

5. The vehicle storage structure according to claim 1, wherein
    the second section of the lid includes a leg member having a first edge and a second edge, the first edge being attached to the second section of the lid for pivotal movement between a retracted position and an extended position, such that with the second section in the extended position and the leg member in the extended position the second edge of the leg member contacts the vehicle floor supporting the second section.

6. The vehicle storage structure according to claim 5, wherein
    the leg member is attached to the second section via a pivot structure that is located at a distal edge of the second section relative to the hinge.

7. The vehicle storage structure according to claim 6, wherein
    the leg member defines at least one recessed area formed adjacent to the second edge, the leg member further including a shaft portion that extends from a first side of the recess to a second side of the recess, the shaft portion being parallel to the second edge of the leg member, the shaft portion at least partially defining the pivot structure.

8. The vehicle storage structure according to claim 7, wherein
    the second section of the lid includes a shaft receiving recess formed along a surface of the second section adjacent to the distal edge of the second section, and the shaft portion is retained for pivotal movement within the shaft receiving recess.

9. A vehicle storage structure comprising:
a vehicle floor;
a vehicle seat assembly fixedly coupled to the vehicle floor;
a storage structure fixedly attached to the vehicle floor between the vehicle floor and a seating section of the vehicle seat assembly, the storage structure including:
a box structure having a cargo compartment;
a lid including a first section and a second section, the first section being movable between a lowered orientation covering the cargo compartment and a raised orientation exposing the cargo compartment, the second section being connected to the first section via a hinge, the second section being pivotally movable about the hinge relative to the first section such that with the first section in the lowered orientation, the second section pivots between a retracted position overlaying the first section and an extended position with the first section and the second section together defining a flat cargo receiving surface that extends forward of the vehicle seat assembly, the second section of the lid including a pair of apertures adjacent to one another that together define a cargo tie-down; and
a locking mechanism fixedly attached to the first section of the lid and being configured to releasably lock the lid in the lowered orientation.

10. The vehicle storage structure according to claim 1, wherein
the seating section of the vehicle seat assembly is attached to the vehicle floor for pivotal movement between a seating orientation and a retracted orientation such that in the seating orientation the seating section overlays the box structure of the storage structure and in the retracted orientation the seating section exposes the storage structure.

11. The vehicle storage structure according to claim 10, wherein
the lid of the storage structure is configured such that with the first section in the lowered orientation and the second section of the lid in the retracted position, the seating section of the vehicle seat assembly overlays the lid of the storage structure.

12. A vehicle storage structure comprising:
a vehicle floor;
a vehicle seat assembly fixedly coupled to the vehicle floor;
a storage structure fixedly attached to the vehicle floor between the vehicle floor and a seating section of the vehicle seat assembly, the storage structure being fixed to the vehicle floor via removable mechanical fasteners, the storage structure including:
a box structure having a cargo compartment;
a lid including a first section and a second section, the first section being movable between a lowered orientation covering the cargo compartment and a raised orientation exposing the cargo compartment, the second section being connected to the first section via a hinge, the second section being pivotally movable about the hinge relative to the first section such that with the first section in the lowered orientation, the second section pivots between a retracted position overlaying the first section and an extended position with the first section and the second section together defining a flat cargo receiving surface that extends forward of the vehicle seat assembly; and
a locking mechanism fixedly attached to the first section of the lid and being configured to releasably lock the lid in the lowered orientation.

13. The vehicle storage structure according to claim 1, wherein
the vehicle floor includes a central section that has an uneven non-planar contour, and the box structure of the storage structure includes a lower surface contoured to mate with the uneven non-planar contour of the vehicle floor.

14. The vehicle storage structure according to claim 13, wherein
the second section of the lid includes a leg member having a first edge and a second edge, the first edge being attached to the second section of the lid for pivotal movement between a retracted position and an extended position, such that with the second section in the extended position and the leg member in the extended position the second edge of the leg member contacts the vehicle floor supporting the second section.

15. The vehicle storage structure according to claim 14, wherein
the second edge of the leg member includes a recessed portion that is shaped to correspond and mate with the uneven non-planar contour of the central section of the vehicle floor.

16. The vehicle storage structure according to claim 1, wherein
the box structure includes an upper surface that includes at least one recess that defines a gap between the lid and the box structure with the first section being in the lowered orientation.

17. A vehicle storage structure comprising:
a vehicle floor,
a vehicle seat assembly fixedly coupled to the vehicle floor
a storage structure fixedly attached to the vehicle floor between the vehicle floor and a seating section of the vehicle seat assembly, the storage structure including:
a box structure having a cargo compartment, the cargo compartment of the box structure including a surface having a recess;
a lid including a first section and a second section, the first section being movable between a lowered orientation covering the cargo compartment and a raised orientation exposing the cargo compartment, the second section being connected to the first section via a hinge, the second section being pivotally movable about the hinge relative to the first section such that with the first section in the lowered orientation, the second section pivots between a retracted position overlaying the first section and an extended position with the first section and the second section together defining a flat cargo receiving surface that extends forward of the vehicle seat assembly; and
a locking mechanism fixedly attached to the first section of the lid and being configured to releasable lock the lid in the lowered orientation, the locking mechanism including a bolt movable between a locking orientation and a releasing orientation, the bolt extending into the recess in the surface of the cargo compartment with the bolt in the locking orientation.

18. The vehicle storage structure according to claim 17, wherein the surface of the cargo compartment is located on a front wall of the box structure.

19. The vehicle storage structure according to claim 1, wherein
the cargo compartment of the box structure includes a surface having a recess, and
the locking mechanism includes a bolt movable between a locking orientation and a releasing orientation, the bolt extending into the recess in the surface of the cargo compartment with the bolt in the locking orientation.

\* \* \* \* \*